United States Patent
Sasaki et al.

(10) Patent No.: US 9,835,769 B2
(45) Date of Patent: Dec. 5, 2017

(54) OPTICAL EFFECT COATING

(71) Applicant: Microsoft Technology Licensing, LLC, Redmond, WA (US)

(72) Inventors: Hiroshi Sasaki, Tampere (FI); Joni Arola, Tampere (FI)

(73) Assignee: Microsoft Technology Licensing LLC, Redmond, WA (US)

(*) Notice: Subject to any disclaimer, the term of this patent is extended or adjusted under 35 U.S.C. 154(b) by 215 days.

(21) Appl. No.: 14/702,924

(22) Filed: May 4, 2015

(65) Prior Publication Data
US 2016/0327689 A1 Nov. 10, 2016

(51) Int. Cl.
*G02B 1/12* (2006.01)
*G01J 1/04* (2006.01)
*G02B 5/00* (2006.01)
*G02B 27/14* (2006.01)

(52) U.S. Cl.
CPC ............ *G02B 1/12* (2013.01); *G01J 1/0437* (2013.01); *G02B 5/003* (2013.01); *G02B 27/147* (2013.01); *G02B 2207/123* (2013.01)

(58) Field of Classification Search
CPC .......... G02B 1/12; G02B 5/003; G01J 1/0437
USPC ........................................ 250/227.26, 237 R
See application file for complete search history.

(56) References Cited

U.S. PATENT DOCUMENTS

| 5,930,047 | A * | 7/1999 | Gunz | G02B 5/20 359/265 |
| 7,880,131 | B2 * | 2/2011 | Andre | G09F 9/30 250/227.26 |
| 8,269,404 | B2 | 9/2012 | Cho et al. | |
| 8,834,004 | B2 | 9/2014 | Thompson et al. | |
| 8,915,596 | B2 | 12/2014 | Amm et al. | |
| 9,041,563 | B2 * | 5/2015 | Mahowald | H01H 13/88 200/341 |
| 2007/0187382 | A1 | 8/2007 | Mauser | |

(Continued)

FOREIGN PATENT DOCUMENTS

| CN | 101706701 A | 5/2010 |
| CN | 103455099 A | 12/2013 |

(Continued)

OTHER PUBLICATIONS

"International Search Report & Written Opinion Issued in PCT Application No. PCT/US2016/027647", dated Jul. 4, 2016, 12 Pages.

(Continued)

*Primary Examiner* — Seung C Sohn

(57) ABSTRACT

A method which may be used for forming an optical effect coating for a light transmission element configured to form a part of a cover of a device is disclosed. The method comprises: printing a first coating layer having a plurality of adjacent first elongated micro openings extending in a first direction in an aperture area, and printing a second coating layer having a plurality of adjacent second elongated micro openings extending in a second direction, the second direction differing from the first direction, in the aperture area. Thereby, an optical effect coating is formed, comprising micro holes formed at intersections of the first and the second elongated micro openings, the micro holes producing locally increased effective light transmittance through the optical effect coating in the aperture area.

20 Claims, 3 Drawing Sheets

(56) References Cited

U.S. PATENT DOCUMENTS

| | | |
|---|---|---|
| 2010/0279075 A1 | 11/2010 | Hou |
| 2013/0038547 A1 | 2/2013 | Lin et al. |
| 2013/0050123 A1* | 2/2013 | Lien ................. G06F 3/041 345/173 |
| 2013/0183015 A1 | 7/2013 | Mori et al. |
| 2014/0183342 A1 | 7/2014 | Shedletsky et al. |
| 2014/0197017 A1 | 7/2014 | Lien et al. |
| 2014/0293580 A1 | 10/2014 | Kuan |
| 2014/0320965 A1 | 10/2014 | Vasylyev |
| 2014/0329172 A1 | 11/2014 | Hart et al. |
| 2015/0352888 A1* | 12/2015 | Schmid .................. B05D 3/20 428/29 |

FOREIGN PATENT DOCUMENTS

| | | |
|---|---|---|
| JP | 2012069330 A | 4/2012 |
| KR | 20130123330 A | 11/2013 |
| KR | 101395673 B1 | 5/2014 |
| KR | 20140055876 A | 5/2014 |
| TW | 201416403 A | 5/2014 |
| WO | 2013038624 A1 | 3/2013 |
| WO | 2013058353 A1 | 4/2013 |

OTHER PUBLICATIONS

Lee, et al., "Combinatorial color arrays based on optical microresonators in monolithic architecture", In Optics express, Jun. 13, 2014, 8 pages.

Wang, et al., "Proximity Detection and IR Ink", In Intelligent OPTO Sensor, Aug. 2011, 5 pages.

"Second Written Opinion Issued in PCT Application No. PCT/US2016/027647", dated Mar. 17, 2017, 7 Pages.

"International Preliminary Report on Patentability Issued in PCT Application No. PCT/US2016/027647", dated: Jul. 21, 2017, 8 Pages.

* cited by examiner

US 9,835,769 B2

OPTICAL EFFECT COATING

BACKGROUND

Various devices may incorporate light sensors for various purposes. Such light sensors may be located behind light transmission elements to receive and detect light incident on the device. So located light sensors may affect the overall appearance of the device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method for forming an optical effect coating for a light transmission element configured to form a part of a cover of a device is described. The method may comprise printing an optical effect coating so as to have a plurality of micro holes in an aperture area, the micro holes locally increasing the effective light transmittance through the optical effect coating. The method may be implemented by printing a first coating layer having a plurality of adjacent first elongated micro openings extending in a first direction in an aperture area, and printing a second coating layer having a plurality of adjacent second elongated micro openings extending in a second direction, the second direction differing from the first direction, in the aperture area. Thereby, an optical effect coating may be formed, comprising micro holes formed at intersections of the first and the second elongated micro openings, the micro holes producing locally increased effective light transmittance through the optical effect coating in the aperture area.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

The drawings of the FIGs. are not in scale.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although some of the present examples may be described and illustrated herein as being implemented in a smartphone, a mobile phone, or a tablet computer, these are only examples of a device and not a limitation. As those skilled in the art will appreciate, the present examples are suitable for application in a variety of different types of devices, such as portable and mobile devices, for example, lap top computers, tablet computers, smart phones, mobile phones, game consoles and game controllers, wrist watches, smart watches, head-mounted displays, and other various wearable devices, etc.

Figure 1:
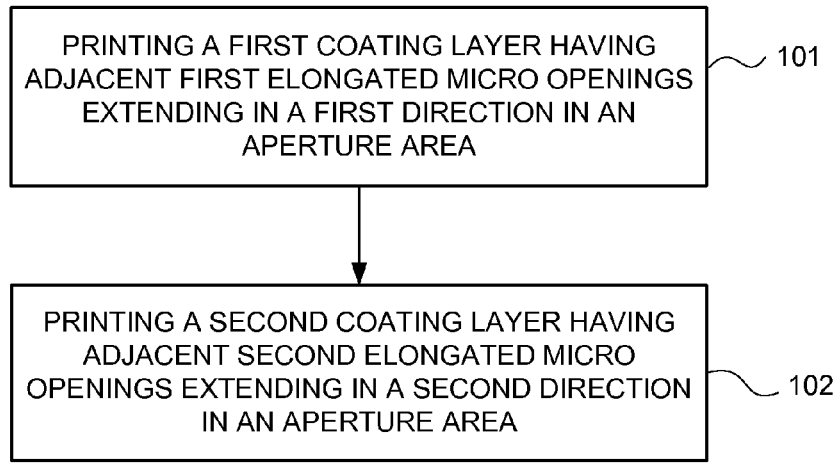
FIG. 1 shows a flow diagram of a method for forming an optical effect coating.

FIG. 1 illustrates a method that can be used for forming an optical effect coating for a light transmission element configured to form a part of a cover of a device.

"Light transmission element" refers here to various elements allowing transmission of light at least at visible and/or near infrared wavelengths through them. Visible wavelengths refer roughly to a wavelength range of about 400 to about 800 nm, whereas near infrared may be considered to cover, for example, wavelengths from about 800 nm to 1400 . . . 1500 nm. The light transmission element may allow transmission also in the ultraviolet wavelength range with wavelengths shorter than the visible wavelengths. Such light transmission element may be, for example, a window plate for a display assembly. Such display assembly may be configured, for example, to form a part of a touch screen or other type of display assembly of a device, which may be, for example, a mobile, portable, or a wearable device. In addition to such window plates, the light transmission element may be any type of element allowing light transmission through it, which element can be used as a part of a cover of a device. In some cases, a light transmission element forming, or configured to form, a part of a device cover may be called and regarded as a "cover lens" for, or of, a device.

The "optical effect coating" refers to any type of coating providing an optical effect differing from the optical performance the light transmission element itself, without such coating, provides. On the other hand, from the visual appearance point of view, such optical effect coating may change the visual appearance of the light transmission element. For example, an optical effect coating may form one or more colored, possibly opaque, i.e. non-transparent, coating patterns on a surface of a light transmission element. In addition to just colors, for example, black or white, the optical effect coating may be configured to form, for example, a reflective coating or an anti-reflection or matte coating on a light transmission element.

The purpose of an optical effect coating may be decorative, i.e. to affect the visual appearance of a device via decorative effect(s). For example, an optical effect coating may be configured to form a frame area on a window plate or some other type of light transmission element, the frame area surrounding a display active area through which a display located behind the light transmission element is visible.

For purely decorative effects, such frame or some other type of optical effect coating may also serve, for example, for hiding or concealing internal device parts lying behind the light transmission element. One example of such internal device parts are various light sensors, for example, ambient light sensors, proximity sensors, iris detectors, or ultraviolet light sensors. Typically, such light sensors receive light incident on the device, actually on a light transmission element forming a part of a cover of the device.

The example method of FIG. 1 starts by printing, in step 101, a first coating layer having a plurality of adjacent first elongated micro openings extending in a first direction in a predetermined aperture area.

Next, in step 102, a second coating layer is printed on the first coating layer, having a plurality of adjacent second elongated micro openings extending in a second direction, which differs from the first direction, in the aperture area.

"Elongated" opening refers to an opening having a length and a width, the length being substantially higher than the width of the opening. The length may be, for example, at least 5 to 10 times higher than the width.

The aperture area refers generally to a predetermined area within the optical effect coating to be formed, in which area the transmittance of light through the optical effect coating is to be increased in comparison to the surroundings of the aperture area. The aperture area may have a square or rectangular shape with sharp or rounded corners, a circular or oval, or any other appropriate shape.

"Micro" refers to at least one characteristic dimension of a micro opening lying in a micrometer scale. In practice, such characteristic dimension may be the width of an opening. To be a "micro" opening, the width of a micro opening may be, for example, less than or equal to 500 μm.

The method thus comprises sequentially printing at least two coating layers, whereby an optical effect coating is formed. "Sequentially refers to printing one of the coating layers before the other. They may be some intermediate printing step carried out between printing the coating layers. The first and the second directions of the first and the second micro openings, respectively, may be, for example, perpendicular to each other. The differently directed first and second elongated micro openings of the two layers have intersections where, when observed perpendicularly relative to the layers, the micro openings of the two layers coincide forming continuous micro holes extending through the entire coating formed by the two layers. Thereby, the optical effect coating comprises micro holes at those intersections. Due to the elongated shape of the micro openings, the micro holes may have substantially rectangular shape.

The micro holes produce locally increased effective light transmittance through the optical effect coating in the aperture area. "Locally" refers to a transmittance of light in the aperture area being higher than the transmittance of light through the optical effect coating outside, i.e. in the surroundings of, the aperture area.

"Effective" light transmittance refers to the fact that actually, there may be different transmittances at different locations in the aperture area. For example, outside the micro holes, the transmittance of light through the optical effect coating is defined by the material of first and the second printed layers, and may be the same as the light transmittance through the optical effect coating outside the aperture area. On the other hand, at the location of the micro holes, where no first or second coating layer material is present, there may be substantially full transmittance of light without any significant absorbance or reflectance of incident light. The effective light transmittance refers to the overall, average transmittance in the aperture area. Thus, the effective light transmittance is an auxiliary parameter indicating the transmittance of a fictitious, continuous coating in the aperture area allowing as big portion of incident light to be transmitted through the coating in the aperture area as is transmitted through the optical effect coating with the micro holes.

The effective light transmittance through the optical effect coating may be adjusted by means of the size and amount of the first and the second micro openings in the printed first and the second coating layers in the aperture area. Thereby, the size and shape of the final micro holes are also adjusted.

The widths of the micro openings and thus the widths of the micro holes may be selected to fall below a typical or average human eye angular resolution. Thereby, the micro hole width can be set lower than what an average human eye, at a typical viewing distance from the device in which the optical effect coating is configured to be used, can resolve. In other words, the micro holes may be formed so as to have a width which is so low that an average human eye cannot see the single micro holes under normal use of that device. Then, the device parts such as a light sensor located behind the aperture area may be concealed, i.e. hidden from visual observation from the outside of the device, although the locally increased light transmittance may allow sufficient light for light sensing purposes to be transmitted or propagated through the optical effect coating to the light sensor. As an example, the width of the micro openings may be less than 100 microns because a human being may be able to resolve an opening of approximate 100 μm at a viewing distance of 50 cm. Other widths may be appropriately selected so that the micro openings are not detectable by human eyes at a given distance.

In other implementations, the width of the micro holes may be, for example, less than or equal to 500 μm, for example, less than or equal to 300 μm or 100 μm. The first and the second coating layers may be also printed to form the first and the second micro openings having different widths, whereby the micro holes may have different widths in different directions.

On the other hand, there may be some lower limit for the widths of the first and the second micro openings and thus of the micro holes. Such lower limit may allow, for example, printing of well-defined, abrupt micro opening edges. Such lower limit may be, depending on the actual printing process used, for example, 50 μm.

The distances between the adjacent first openings and the adjacent second micro openings may be, for example, 50 to 500 μm, for example, in the range of 100 to 300 μm.

The first and the second coating layers may be printed using any appropriate ink or other printable material. Various inks are known and available from several suppliers, for example, for printing colored coatings on window plates and other types of light transmission elements for various electronic devices e.g. in the field of computing, communications, and consumer electronic devices. An ink may comprise, for example, resin (e.g. epoxy resin), one or more pigments, and one or more solvents. Also hardeners may be included in various inks.

The first and the second coating layers may be printed using a same ink. Alternatively, different inks may be used for printing the first and the second coating layers.

As one example, an ink may be used having a light transmittance which is higher at near infrared wavelengths than at visible wavelengths. Such ink may produce a visually opaque, i.e. opaque at visible wavelengths, optical effect coating, which however transmits infrared light sufficiently to allow infrared light detection through the aperture area. On the other hand, due to the adjustability of the effective light transmittance via the size and amount of micro holes in the aperture area, also one or more inks may be used which form at least one completely opaque layer in the optical effect coating.

Figure 2:
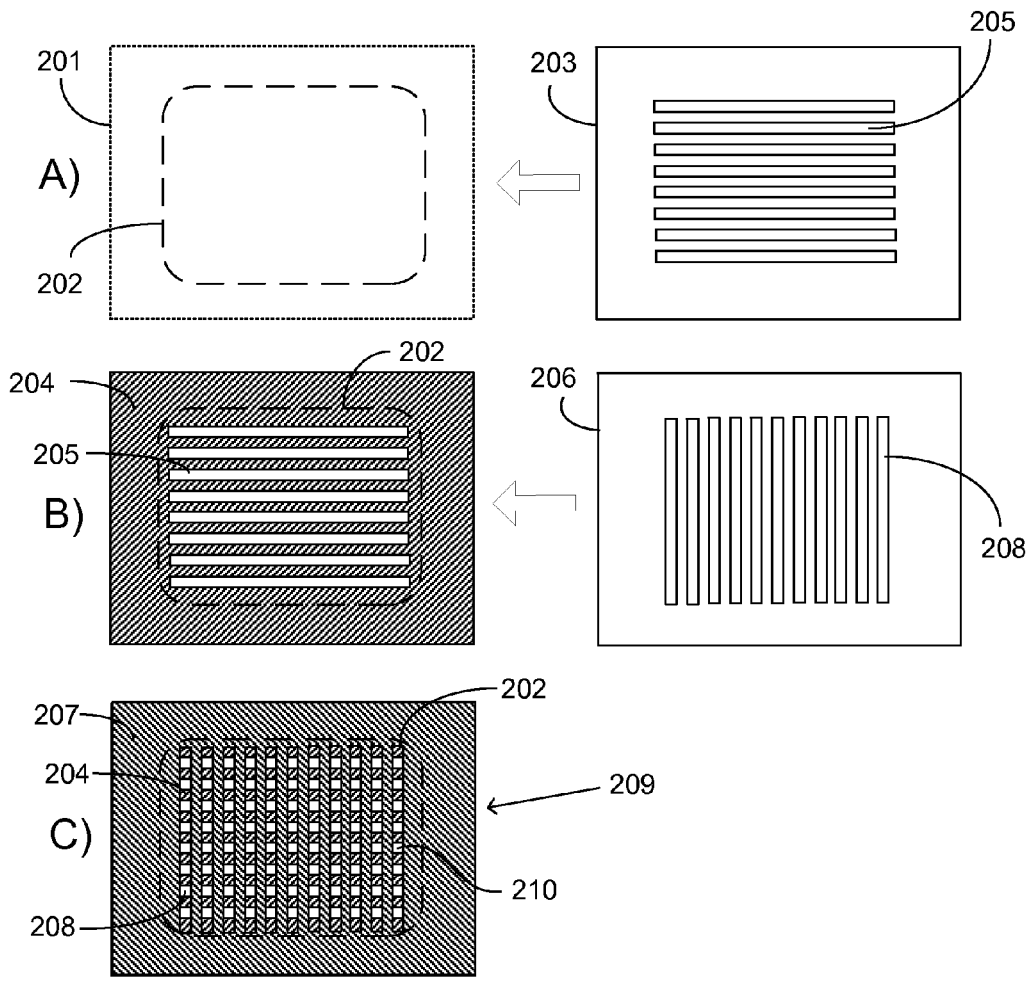
FIG. 2 illustrates steps of a method for forming an optical effect coating.

The method illustrated in FIG. 2 may be carried out generally in accordance with principles discussed above concerning the example if FIG. 1. Correspondingly, the resulting optical effect coating may be in accordance what is discussed above with reference to FIG. 1.

In graph A), a portion 201 of an optical effect coating area to be printed is marked. The portion, marked using a dashed line in FIG. 2, may be configured to form a part of an optical effect coating having any overall shape. For example, the complete optical effect coating may be shaped as a frame dimensioned to encircle a central region of a window plate of a display assembly for a device. The portion of the optical effect coating shown in FIG. 2 comprises a predetermined aperture area 202.

A first coating layer 204 is first printed, using a first printing pattern 203, in the optical effect coating area, the first printing pattern and thus the first coating layer having a plurality of adjacent first micro openings 205 in the aperture area 202. The situation after printing the first coating layer is illustrated in graph B).

Next, a second coating layer 207 is printed, using a second printing pattern 206, in the optical effect coating area, the second printing pattern and thus the second coating layer having a plurality of adjacent second micro openings 208 in the aperture area. The printed first and the second coating layers together form an optical effect coating 209, as illustrated in graph C).

The first and the second printing patterns are configured to produce the first and the second micro openings 205, 208 as being directed substantially perpendicularly with each other. Thereby, a mesh of intersecting first and second micro openings is formed in the aperture area 202. At the locations where the first and the second micro openings coincide, the first and the second micro openings form substantially rectangular micro holes 210 through the optical effect coating 209. In the case of the first and the second micro openings having identical widths, the micro holes have a square shape.

Additional layer(s) may be printed or otherwise formed on the optical effect coating in addition to the first and the second coating layers thereof. In this way, for example, different shaped openings may be formed such as hexagons or octagons. Additionally or alternatively, one or more additional protective and/or anti-reflection layers may be formed on one or both sides of the optical effect coating.

In the above examples, the first and the second coating layers forming the optical effect coating may be printed directly on a transparent body of the actual light transmission element to be coated.

Alternatively, the first and the second coating layers may be printed on a carrier element serving as a temporary substrate from which the optical effect coating may be released and laminated on a transparent body of the actual light transmission element.

"Printing" refers generally to various additive techniques to form material layers in accordance with predetermined printing patterns. Printing techniques applicable to use for printing the first and the second coating layers comprise, for example, screen printing, tampo printing (pad printing), and offset printing. The most preferable technique depends, for example, on the substrate on which the coating layers are to be printed, the printing patterns, and the ink or other printing material to be used.

In the above, examples has been discussed mainly focusing on a method aspect. In the following, more emphasis is put on issues related to example device and product configurations which may be produced in accordance with the above examples of the method aspect. On the other hand, the above explanation may be considered discussing possible ways of producing the device, product, or arrangement examples discussed below. What is stated above, in the context of the method aspect, about definitions, details, way of implementation, and possible advantages apply, whenever appropriate, to the device and product aspects below. The same applies vice versa.

Figure 3:
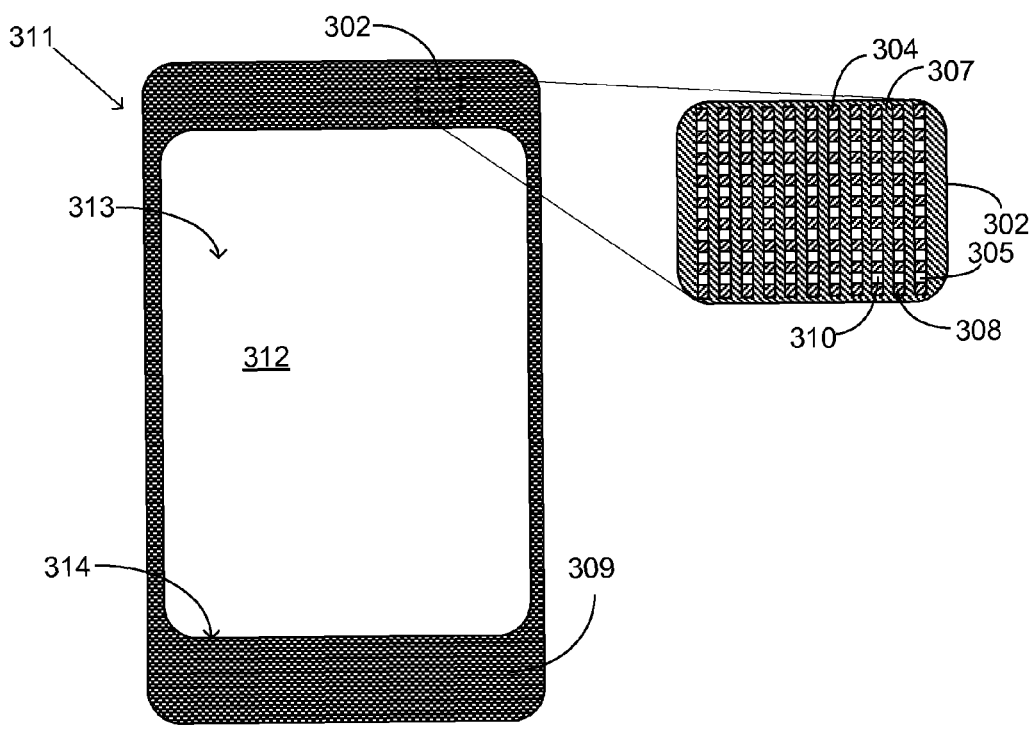
FIG. 3 shows a front view of a window plate having an optical effect coating thereon.

The window plate 311 of FIG. 3 may be configured, for example, to form a part of a display assembly, in turn forming a part of a cover of a device, which can be, for example, a mobile device such as a mobile phone, smart phone, or a tablet computer. In this sense, the window plate 311 may be considered as illustrating a complete device.

The window plate 311 has a transparent body 312. Thus, the window plate 311 may serve as a light transmission element allowing light to be transmitted or propagated through it.

The transparent body has a surface 313, which may be a back or front surface of the window plate when assembled in a device. "Front" surface refers to the user side of the window plate when assembled as a part of a complete device, whereas the "back" surface refers to the opposite surface facing the inner side of the device. A circumferential frame 309 is formed on a peripheral area 314 of the window plate on this surface 313.

The frame 309 may be formed as a colored coating which may be substantially opaque, i.e. non-transparent, or semi-transparent in visible wavelengths. Alternatively, or in addition to color effect(s), the frame may also produce some other optical effects, such as, for example, increased or decreased reflectivity. Generally, the frame thus serves as an optical effect coating.

The frame/optical effect coating 309 may be formed according to any of the method examples discussed above. On the other hand, the frame 309 is an example of an optical effect coating formable by the methods of the examples discussed above.

The frame 309 serving as optical effect coating is formed of a first and a second coating layer 304, 307. The frame 309 has an aperture area 302 in which the first coating layer has a plurality of adjacent first elongated micro openings 305 extending in a first direction, and the second coating layer has a plurality of adjacent second elongated micro openings 308 extending in a second direction which is substantially perpendicular to the first direction.

The intersecting micro openings of the first and the second coating layers 304, 307 form an array of substantially rectangular micro holes 310 through the frame at the locations where the micro openings of the first and the second coating layers intersect. The micro holes produce locally increased effective light transmittance through the optical effect coating in the aperture area 302. As discussed above, such increased effective transmittance may allow sufficient light to pass through the frame in the aperture area to a light sensor positioned behind the frame. On the other hand, as discussed above, single micro holes 310 can be dimensioned so that they are not visible from normal observing distances of a device into which the window plate may be integrated. Thereby, a light sensor or any other device part behind the frame may be concealed so that it is not visible for a user of such device.

From a complete device point of view, the window plate 311 may thus be incorporated into a device having a light sensor positioned so that light can propagate from the surroundings, i.e. from the outside, of the device through the aperture area to the light sensor. Such light sensor may be, for example, a part of a light sensing arrangement, a proximity sensing arrangement, an iris detection arrangement, or an ultraviolet light sensing arrangement.

Figure 4:
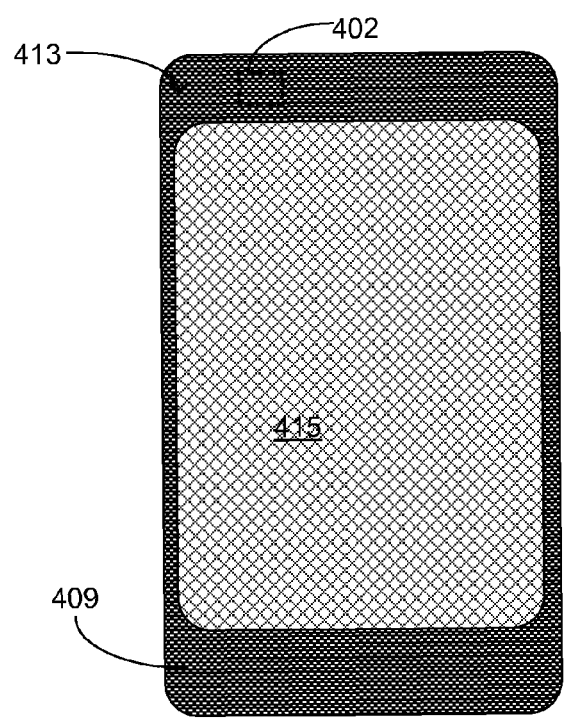
FIG. 4. shows a front view of a temporary carrier plate having an optical effect coating thereon.

FIG. 4 shows a frame 409 which may be in accordance of the frame 309 of FIG. 3. However, instead printing on a transparent body of a window plate of another light transmission element, the frame 409 has been printed on a temporary carrier plate 415, from which the frame can be released and further laminated on a transparent body of a light transmission element. The frame 409 of FIG. 4 has a pattern which is mirrored relative to the frame 309 of FIG. 3 so that the aperture area 402 is located at an opposite side of a fictitious center line of the carrier plate 415 in comparison to the aperture area 302 of the example of FIG. 3. The frame 409 may be laminated on a transparent body of a light transmission element so that the free surface 413 of the frame 409 facing away from the temporary carrier plate 415 becomes against the light transmission element. Then, the pattern of the laminated frame becomes similar to that of the frame 309 of the window plate 311 of FIG. 3. The frame 409 serving as an optical effect coating is an example of a simple apparatus not necessarily comprising any other part, element, or component than the optical effect coating itself.

Although there is one aperture area in the frame in the examples of FIGS. 3 and 4, in other examples, there can be a plurality of aperture areas with micro holes locally increasing the effective light transmittance at different locations of an optical effect coating. On the other hand, a frame shaped and dimensioned to follow a peripheral area of a window plate is merely one example of possible optical effect coating configurations. The principles of an aperture area with a plurality of micro holes may be applied to any type of optical effect coatings for any types of light transmission elements configured to form a part of a device cover.

Figure 5:
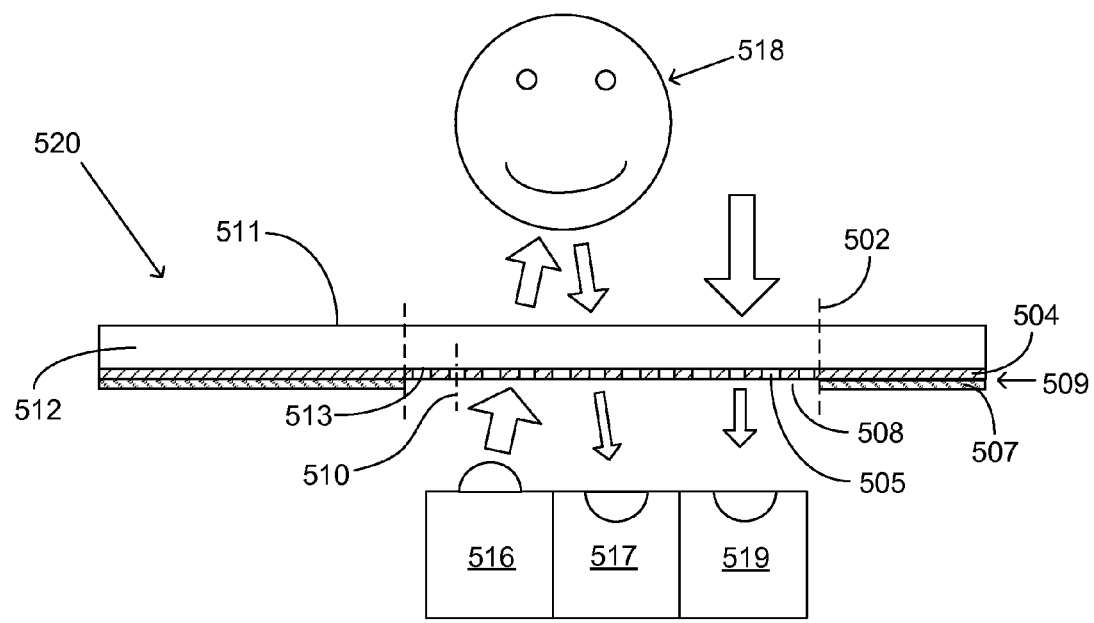
FIG. 5 shows a schematic sectional side view of a part of a device having a light sensing arrangement.

The device 520 has a light transmission element in the form of a window plate 511 which can be, for example, a window plate forming a part of a display of the device. Such display may be, for example, a part of a touch screen assembly (no other parts of a display or a touch screen are shown in FIG. 5).

The window plate 511 has a transparent body 512. The body has a back surface 513 facing towards the inner side of the device. A decorative coating 509 serving as an optical effect coating is formed on this surface. It may be configured and manufactured in accordance with any of the examples discussed above.

The decorative coating 509 may be, for example, formed as a colored, substantially opaque coating. It comprises two coating layers 504, 507 printed on the back surface 513 of the window plate, a first coating layer 504 being attached to the lower surface 513 of the transparent body, and a second coating layer 507 lying mainly on the first coating layer.

The decorative coating 509 has an aperture area 502, in which each of the two coating layers comprises a plurality of adjacent elongated micro openings 505, 508. The micro openings of the two coating layers are directed perpendicularly to each other. FIG. 5 shows a sectional view along a micro opening 508 in the second coating layer. Therefore, in the aperture area 502, only the first coating layer is shown in FIG. 5.

The intersecting elongated micro openings 505, 508 define a plurality of substantially rectangular micro holes 510 in the aperture area. The micro holes increase locally the effective light transmittance through the decorative coating 509 in the aperture area 502.

The device 520 also comprises an infrared light emitter 516 and an infrared light sensor 517 located behind the window plate 511, at the location of the aperture area. Thereby, part of light emitted by the infrared light emitter 516 can be propagated through the aperture area to the outside of the device, as illustrated by arrows marked in FIG. 5. Further, part of such infrared light reflected from an external object, e.g. a user 518 of the device, may be propagated again through the aperture area and received by the infrared light sensor 517, as also marked by arrows in FIG. 5. Such infrared light emitter and infrared light sensor, together with the window plate 510, may serve as a proximity sensing arrangement.

Further, the device 520 also comprises an additional light sensor 519 located behind the window plate 511 so located relative to the aperture area 502 that part of ambient light from the outside of the device, incident on the window plate 511, can be propagated through the aperture area 502 to the additional light sensor 519 as illustrated by further arrows in FIG. 5. This kind of light sensing arrangement can be used for ambient light sensing.

In the example of FIG. 5, there are thus two light sensing arrangements in a single device, utilizing the same aperture area. In other examples, there may be just one single light sensing arrangement in a device, or one single light sensing arrangement per one aperture area. Instead of, or in addition to, the proximity sensing arrangement and the ambient light sensing arrangement shown in FIG. 5, a device may also have other types of light sensing arrangements. For example, with an imaging light sensor, an iris detecting arrangement may be implemented. Further, with an ultraviolet light sensor, an ultraviolet radiation/light sensing arrangement may be implemented.

The effective light transmittance in the aperture area may be adjusted via the number and size of the micro openings 505, 508, and thereby the number and size of the micro holes 510 in the aperture area so that sufficient transmittance for the light sensing purposes is achieved. On the other hand, as discussed above, the micro openings 505, 508 and thereby also the micro holes 510 may be dimensioned so that, as discussed above, the size of single micro holes is so small that the micro holes are not visible for a human eye with normal observation distances. Thereby, the aperture area 502 may conceal the light emitter 516 and the light sensors 517, 519 located below the decorative coating 509.

The size and amount of the micro holes 510 in the aperture area affect the effective light transmittance both at infrared and at visible wavelengths. Naturally, they affect possible transmittance also at ultraviolet wavelengths. Further, the material of the first and the second coating layers may be partially transparent, i.e. not completely opaque. First, the material may form coating layers which are generally semi-transparent with substantial transmittance throughout the visible and near infrared wavelength ranges. On the other hand, the material of the first and the second coating layers may be selectively transparent depending on wavelengths. For example, the material may be substantially opaque at visible wavelengths but partially transparent at infrared wavelengths. This may allow an increased transmittance at infrared wavelengths, without deteriorating the concealing performance of the aperture area at visible wavelengths.

In the device 520 of FIG. 5, the decorative coating lies on the back surface 513 of the window plate, the back surface lying on the side of the infrared light emitter 516 and the light sensors 517, 518. In another example, a decorative coating or some other optical effect coating may lie on a surface of a transmission element opposite to the side of a light sensor.

Some aspects are further discussed shortly in the following.

A method for forming an optical effect coating for a light transmission element configured to form a part of a cover of a device comprises: printing an optical effect coating comprising a plurality of micro holes in an aperture area, the micro holes producing locally increased effective light transmittance through the optical effect coating in the aperture area.

In an embodiment, a method for forming an optical effect coating for a light transmission element configured to form a part of a cover of a device comprises: printing a first coating layer having a plurality of adjacent first elongated micro openings extending in a first direction in an aperture area, and printing a second coating layer having a plurality of adjacent second elongated micro openings extending in a second direction, the second direction differing from the first direction, in the aperture area, whereby an optical effect coating is formed, comprising micro holes formed at intersections of the first and the second elongated micro openings, the micro holes producing locally increased effective light transmittance through the optical effect coating in the aperture area. The micro holes may be substantially rectangular.

In an embodiment, which may be in accordance with the preceding embodiment, the first and the second elongated micro openings have a width less than or equal to 500 µm, for example, less than or equal to 300 µm or 100 µm.

In an embodiment, which may be in accordance with any of the preceding embodiments, the first and the second elongated micro openings are located with a distance of 50 to 500 µm, for example, 100 to 300 µm between the adjacent micro openings.

In an embodiment, which may be in accordance with any of the preceding embodiments, at least one of the first and the second coating layers is printed using an ink with transmittance at near infrared wavelengths substantially exceeding the transmittance at visible wavelengths.

In an embodiment, which may be in accordance with any of the first three embodiments above, at least one of the first and the second coating layers is printed using an ink forming a substantially opaque coating layer.

In an embodiment, which may be in accordance with any of the preceding embodiments, the first and the second coating layers are printed on a transparent body of a light transmission element.

In an embodiment, which may be in accordance with any of the first five embodiments above, the first and the second coating layers are printed on a carrier element allowing laminating the optical effect coating on a transparent body of a light transmission element.

An optical effect coating for a light transmission element configured to form a part of cover of a device comprises an optical effect coating comprising a plurality of micro holes in an aperture area, the micro holes producing locally increased effective light transmittance through the optical effect coating in the aperture area. An apparatus may comprise the optical effect coating. Such apparatus may comprise merely the optical effect coating. Such apparatus may also comprise other parts, elements, and components.

In an embodiment, an optical effect coating for a light transmission element configured to form a part of cover of a device, comprises: a first coating layer having a plurality of adjacent first elongated micro openings extending in a first direction in an aperture area, and a second coating layer having a plurality of adjacent second elongated micro openings extending in a second direction, the second direction differing from the first direction, in the aperture area, whereby the optical effect coating comprises micro holes formed at intersections of the first and the second elongated micro openings, the micro holes producing locally increased effective light transmittance through the optical effect coating in the aperture area. The first and the second coating layers may be printed. The micro holes may be substantially rectangular.

In an embodiment, which may be in accordance with the preceding optical effect coating embodiment, the micro holes have a maximum diameter less than or equal to 500 µm, for example, less than or equal to 300 µm or 100 µm.

In an embodiment, which may be in accordance with any of the preceding optical effect coating embodiments, the first and the second elongated micro openings are located with a distance of 50 to 500 µm, for example, 100 to 300 µm between the adjacent micro openings.

In an embodiment, which may be in accordance with any of the preceding optical effect coating embodiments, at least one of the first and the second coating layers has a transmittance at near infrared wavelengths substantially exceeding the transmittance at visible wavelengths.

In an embodiment, which may be in accordance with any of the preceding optical effect coating embodiments above, at least one of the first and the second coating layers is substantially opaque.

A light transmission element configured to form a part of a user interface of a device comprises a transparent body having a surface, and an optical effect coating which may be in accordance with any of the optical effect coating embodiments above. The above apparatus may comprise, in addition to the optical effect coating, also such light transmission element.

In an embodiment, the optical effect coating forms a circumferential frame on a peripheral area of the surface of the transparent body.

In an embodiment, which may be in accordance with any of the preceding light transmission element embodiments above, the light transmission element is formed as a window plate for a display.

A device, which may be a mobile device, has a light sensor and a light transmission element in accordance with any of the light transmission embodiments above configured to form a part of a cover of the device, the aperture area of the optical effect coating and the light sensor being positioned to allow light from the surroundings of the device to propagate through the aperture area to the light sensor. The above apparatus may comprise, in addition to the light transmission element comprising the optical effect coating, also such device.

In an embodiment, the light sensor is a light sensor of one of an ambient light sensing arrangement, a proximity sensing arrangement, an iris detecting arrangement, and an ultraviolet light sensing arrangement The device may alternatively also be a portable device, a wearable device, or any device where a light transmission element can form a part of a cover of the device, for example, as part of a display assembly.

A light sensing arrangement for a mobile device comprising: a light transmission element having a transparent body with an optical effect coating thereon, the optical effect coating comprising two layers and an aperture area with a plurality of micro holes defined by intersecting elongated micro openings formed in the two layers, and a light sensor located behind the light transmission element to receive light propagating through the aperture area of the optical effect coating, the micro holes being dimensioned to conceal the light sensor from visual observation through the aperture area. The micro holes may be substantially rectangular.

In an embodiment, the optical effect coating lies on a surface of the light transmission element on a side of the light sensor.

In an embodiment, which may be in accordance with the previous embodiment, the light sensing arrangement further comprises a light emitter located behind the light transmission element to transmit light through the aperture area.

In an embodiment, which may in accordance with any of the preceding light sensing arrangement embodiments, the optical effect coating has a transmittance which is higher at a near infrared wavelength range than at a visible wavelength range.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term "comprising" is used in this specification to mean including the features followed thereafter, without excluding the presence of one or more additional features.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

The invention claimed is:

1. A method comprising:
   printing a first coating layer having a plurality of adjacent first elongated micro openings extending in a first direction in an aperture area; and
   printing a second coating layer having a plurality of adjacent second elongated micro openings extending in a second direction, the second direction differing from the first direction, in the aperture area;
   whereby an optical effect coating is formed, comprising micro holes formed at intersections of the first and the second elongated micro openings, the micro holes producing locally increased effective light transmittance through the optical effect coating in the aperture area.

2. A method as defined in claim 1, wherein the first and the second elongated micro openings have a width less than or equal to 500 µm.

3. A method as defined in claim 1, wherein the first and the second elongated micro openings are located with a distance of 50 to 500 µm between the adjacent micro openings.

4. A method as defined in claim 1, wherein at least one of the first and the second coating layers is printed using an ink with transmittance at near infrared wavelengths substantially exceeding the transmittance at visible wavelengths.

5. A method as defined in claim 1, wherein at least one of the first and the second coating layers is printed using an ink forming a substantially opaque coating layer.

6. A method as defined in claim 1, wherein the first and the second coating layers are printed on a transparent body of a light transmission element.

7. A method as defined in claim 1, wherein the first and the second coating layers are printed on a carrier element allowing laminating the optical effect coating on a transparent body of a light transmission element.

8. An apparatus comprising:
   an optical effect coating comprising:
      a first coating layer having a plurality of adjacent first elongated micro openings extending in a first direction in an aperture area; and
      a second coating layer having a plurality of adjacent second elongated micro openings extending in a second direction, the second direction differing from the first direction, in the aperture area;
   whereby the optical effect coating comprises micro holes formed at intersections of the first and the second elongated micro openings, the micro holes producing locally increased effective light transmittance through the optical effect coating in the aperture area.

9. An apparatus as defined in claim 8, wherein the micro holes have a maximum diameter less than or equal to 500 µm.

10. An apparatus as defined in claim 8, wherein the first and the second elongated micro openings are located with a distance of 50 to 500 µm between the adjacent micro openings.

11. An apparatus as defined in claim 8, comprising:
   a light transmission element configured to form a part of a user interface of a device, comprising a transparent body having a surface, and the optical effect coating attached on the surface.

12. An apparatus as defined in claim 11, wherein the optical effect coating forms a circumferential frame on a peripheral area of the surface of the transparent body.

13. An apparatus as defined in claim 11, formed as a window plate for a display.

14. An apparatus as defined in claim 11, comprising a device having a light sensor and the light transmission element configured to form a part of a cover of the device, the aperture area of the optical effect coating and the light sensor being positioned to allow light from surroundings of the device to propagate through the aperture area to the light sensor.

15. An apparatus as defined in claim 14, wherein the light sensor is a light sensor of one of an ambient light sensing arrangement, a proximity sensing arrangement, an iris detecting arrangement, and an ultraviolet light sensing arrangement.

16. An apparatus as defined in claim 14, wherein the device is a mobile device.

17. A light sensing arrangement for a mobile device comprising:
   a light transmission element having a transparent body with an optical effect coating thereon, the optical effect coating comprising two layers and an aperture area with a plurality of micro holes defined by intersecting elongated micro openings formed in the two layers, the micro holes producing locally increased effective light transmittance through the optical effect coating; and a light sensor located behind the light transmission element to receive light propagating through the aperture area of the optical effect coating;

the micro holes being dimensioned to conceal the light sensor from visual observation through the aperture area.

18. A light sensing arrangement as defined in claim 17, wherein the optical effect coating lies on a surface of the light transmission element on a side of the light sensor.

19. A light sensing arrangement as defined in claim 17, further comprising a light emitter located behind the light transmission element to transmit light through the aperture area.

20. A light sensing arrangement as defined in claim 17, wherein the optical effect coating has a light transmittance which is higher at a near infrared wavelength range than at a visible wavelength range.

* * * * *